(12) United States Patent
Cole et al.

(10) Patent No.: US 11,804,152 B2
(45) Date of Patent: Oct. 31, 2023

(54) SYSTEMS AND METHODS FOR VISUALIZING EFFECTS

(71) Applicant: KMM TECHNOLOGY, INCORPORATED, Ontario, CA (US)

(72) Inventors: Maury D. Cole, San Diego, CA (US); Kim N. Wilcox, Ontario, CA (US)

(73) Assignee: KMM TECHNOLOGY, INCORPORATED, Ontario, CA (US)

( * ) Notice: Subject to any disclaimer, the term of this patent is extended or adjusted under 35 U.S.C. 154(b) by 478 days.

(21) Appl. No.: 17/061,243

(22) Filed: Oct. 1, 2020

(65) Prior Publication Data

US 2021/0104180 A1 Apr. 8, 2021

Related U.S. Application Data

(60) Provisional application No. 62/909,634, filed on Oct. 2, 2019.

(51) Int. Cl.
*G09B 23/34* (2006.01)
*G06F 3/14* (2006.01)

(52) U.S. Cl.
CPC ............... *G09B 23/34* (2013.01); *G06F 3/14* (2013.01)

(58) Field of Classification Search
None
See application file for complete search history.

(56) References Cited

U.S. PATENT DOCUMENTS

| 7,252,050 B2 | 8/2007 | Cole | |
|---|---|---|---|
| 11,250,383 B2 * | 2/2022 | Sharma | G06F 40/117 |
| 2002/0098272 A1 * | 7/2002 | Silver | A23L 29/244 |
| | | | 426/578 |
| 2007/0059454 A1 * | 3/2007 | Slimak | B01D 53/72 |
| | | | 106/125.1 |
| 2007/0260313 A1 * | 11/2007 | Sidler | A61B 17/68 |
| | | | 604/506 |
| 2016/0332388 A1 | 11/2016 | Park et al. | |
| 2016/0374618 A1 * | 12/2016 | Giovangrandi | A61B 5/0537 |
| | | | 600/393 |
| 2018/0228990 A1 | 8/2018 | Cole | |
| 2020/0237225 A1 * | 7/2020 | Addison | A61B 5/1128 |
| 2020/0253560 A1 * | 8/2020 | De Haan | A61B 5/746 |
| 2021/0235992 A1 * | 8/2021 | Addison | A61B 5/0826 |
| 2022/0046997 A1 * | 2/2022 | Atkins | A24F 40/90 |

FOREIGN PATENT DOCUMENTS

| KR | 20160047238 A | 5/2016 |
|---|---|---|
| WO | 2017049380 A1 | 3/2017 |

OTHER PUBLICATIONS

Xi et al., "Visualization of local deposition of nebulized aerosols in a human upper respiratory tract model," Journal of The Visualization, vol. 21, No. 2, Nov. 27, 2017, pp. 225-237.
Cheung et al., "An externally and internally deformable, programmable lung motion phantom," Medical Physics, Apr. 24, 2015, vol. 42, No. 5, pp. 2585-2593.
International Preliminary Report on Patentability for PCT/US2020/054019 dated Apr. 14, 2022, 8 pages.

* cited by examiner

Primary Examiner — Toan H Vu
(74) Attorney, Agent, or Firm — PROCOPIO, CORY, HARGREAVES & SAVITCH LLP

(57) ABSTRACT

The present disclosure provides systems and methods for visualizing various effects of consuming (e.g., inhaling) one or more substances, especially on the human brain and lungs.

20 Claims, 10 Drawing Sheets

SYSTEMS AND METHODS FOR VISUALIZING EFFECTS

CROSS REFERENCE TO RELATED APPLICATIONS

This application claims priority to U.S. provisional patent application Ser. No. 62/909,634, filed on Oct. 2, 2019. This and all other extrinsic materials discussed herein are incorporated by reference in their entirety. Where a definition or use of a term in an incorporated reference is inconsistent or contrary to the definition of that term provided herein, the definition of that term provided herein applies and the definition of the term in the reference does not apply.

FIELD OF THE INVENTION

The field of the invention is systems and methods that allow users, especially students, to visualize how consuming certain substances affect the human body, especially the brain and lungs.

BACKGROUND

Vaping has become increasingly popular, especially among our youth. Many junior high school and high school students are vaping nicotine and other substances, and even sneaking vaping devices into their schools using what looks like normal hoodies and smart watches that hide vaping components.

Substance inhalation systems and methods such as those described in U.S. Patent Application Publication 2018/0228990 and/or U.S. Pat. No. 7,252,050 to Maury D. Cole are known and used in laboratory settings to test the effects of substances on animals such as mice, rats and other small rodents in a research laboratory setting. Unfortunately, there are no known systems or methods that allow young students to adequately control and visualize the effects of consuming harmful substances in a school setting.

The present disclosure is directed toward one or more improved features identified below, and to devices and systems that address the above-mentioned problems.

SUMMARY

The inventive subject matter provides a visualization system comprising: a model of an organ or portion thereof comprising an inlet port and an outlet port; a supply system for supplying a vaporized test liquid into the inlet port; a first supply path between the first supply system and the inlet port; and wherein the model is configured to show a first visual indicator based on the vaporized test liquid entering the model.

The first visual indicator can comprise, for example, a collection of fluid/condensation, and/or one or more of a change in a color, a pattern and a brightness of a light. The visual indicator(s) can illustrate to a student or other user how inhaling a vaporized substance can damage organs such as lungs and brains, and the impact shown may correlate to the represented consumer's age, sex, weight, height, health, and/or any other suitable factors. The model(s) can be representative of a consumer's brain, lung, and/or any other suitable organ, and may be sized and dimensioned to be substantially the same in size and dimensions of the represented user. For example, the height, width and/or volume of the model of an organ can be within 20% or within 10% of the height, width and/or volume of an average young adult/ adult's organ. The model may comprise adjustable components that allow the size of the model organ and/or components therein (e.g., chambers, lobes) to be adjusted by a user and locked in place.

The supply system may comprise a vaporizer that vaporizes a test liquid into a vaporized test liquid. The supply system may also comprise a controller for controlling the supply of a vaporized test liquid and/or air into the model, and a liter per minute gauge or other flow rate measuring device.

The supply path may comprise a hose or hoses through which the vaporized test liquid flows from the vaporizer into the model of the organ. Exemplary supply paths include one or more hoses, such as a Y-shaped hose system with multiple hose arms.

A second supply path may extend between one or more outlets of the model and a vacuum system comprising a vacuum pump and a HEPA or other filter. The vacuum pump may be configured to draw ambient air and/or vaporized test fluid into the model when coupled to the outlets of the model via the liter per minute gauge and/or the vaporizer and/or an air supply of the supply system. For example, the vacuum pump may be configured to draw in ambient air only when the vaporizer is turned off, and to draw in both ambient air and vaporized test fluid when the vaporizer is turned on. Air and/or vaporized test liquid exiting the model may be vacuumed through a HEPA filter before exiting the system.

The inventive subject matter also provides a visualization system comprising: a first model of a first organ or portion thereof comprising an inlet port and an outlet port; a supply system for supplying a vaporized test liquid and/or ambient air into the inlet port; a first supply path between the first supply system and the inlet port; a first input device communicatively coupled to at least one of the supply system and the first model; and wherein the first model is configured to show a first visual indicator based on the vaporized test liquid entering the first model.

The system may further comprise a second model of a second organ, wherein the first input device is communicatively coupled to the second model of the second organ. The second model may be configured to show a second visual indicator based on a user input into the first input device that corresponds to an amount or type of vaporized test liquid entering the first model and/or user information such as age, sex, weight, height, and/or health.

In some contemplated aspects, the system may comprise a computing device programmed with a curriculum relating to use of the first input device, the first supply system, and the first model. The curriculum can be associated with a health institution, a research laboratory, and/or a school/ university.

One or more displays associated with at least one of the input device and the computing device may be configured to display a visual indicator based on a user input into the first input device that corresponds to an amount or type of vaporized test liquid entering the first model and/or user information. The visual indicator or indicators may comprise a modified image of a user's face showing the impact of consuming substances on a user's appearance (in addition to the user's organ(s)) displayed on a display of the input device or computing device. The visual indicator or indicators may additionally or alternatively comprise a modified image, images and/or video of a lung or brain or other organ or model/representation thereof showing the impact of consuming substances on the organ.

In some preferred embodiments, the first model of a first organ is a model of a lung and a second model of a second organ is a model of a brain. However, it should be appreciated that the models can comprise representations of any organ or organs for visualization purposes. The test liquid that is vaporized to form the vaporized test liquid can comprise any substance to be tested (e.g., alcohol, nicotine, methamphetamine, heroin, cocaine, fentanyl (opioids), psychostimulants, and/or a poly drug.), or can be drug-free and include a test liquid representative of one or more drugs.

A second supply path may extend between one or more outlets of the model and a vacuum system comprising a vacuum pump and a HEPA or other filter. The vacuum pump may be configured to draw ambient air and/or vaporized test fluid into the model via the liter per minute gauge and/or the vaporizer of the supply system. For example, the vacuum pump may be configured to draw in ambient air only when the vaporizer is turned off, and to draw in both ambient air and vaporized test fluid when the vaporizer is turned on. Any suitable vacuum pump may be used in contemplated systems. The air supply may be provided by ambient air, or from an air tank, a valve from a laboratory air source, or the like.

Other advantages and benefits of the disclosed compositions and methods will be apparent to one of ordinary skill with a review of the following detailed description.

BRIEF DESCRIPTION OF THE DRAWINGS

The details of various embodiments will be more fully understood by reference to the following drawings which are for illustrative purposes only.

DETAILED DESCRIPTION

Figure 1A:
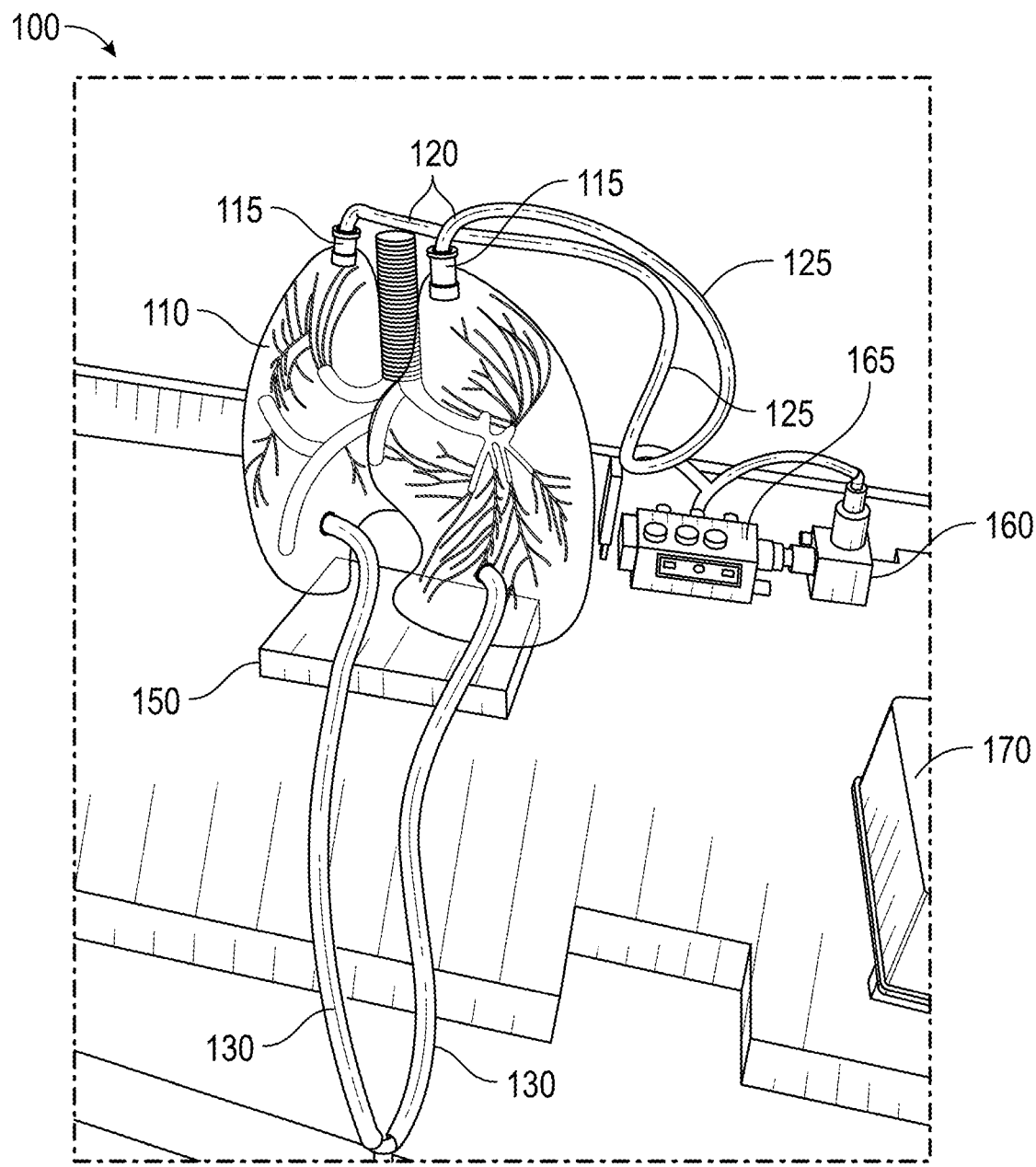
FIG. 1A is a perspective view of an embodiment of a system of the inventive subject matter.
Figure 1B:
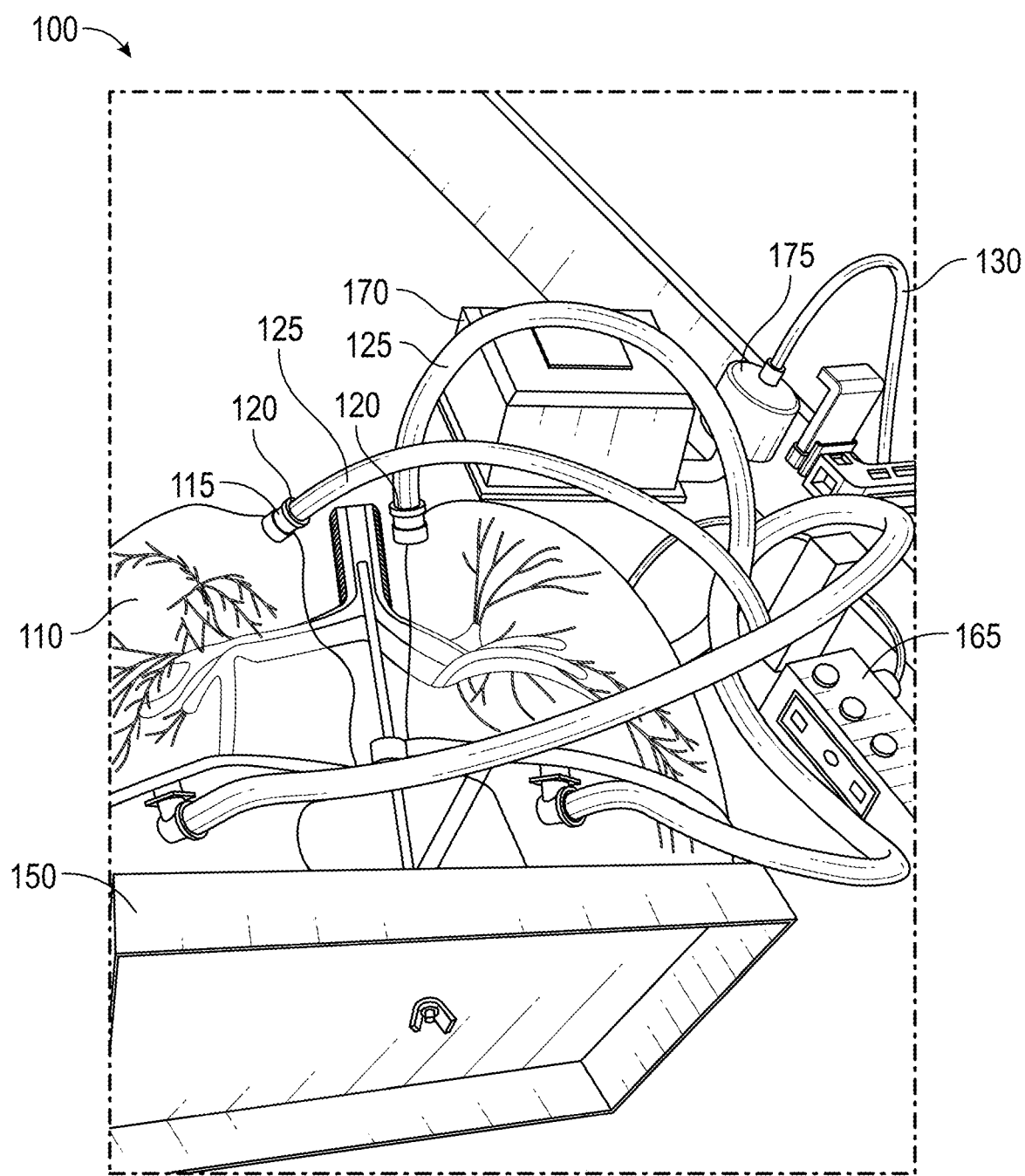
FIG. 1B illustrates the system of FIG. 1A showing the rear view of the lung model.
Figure 1C:
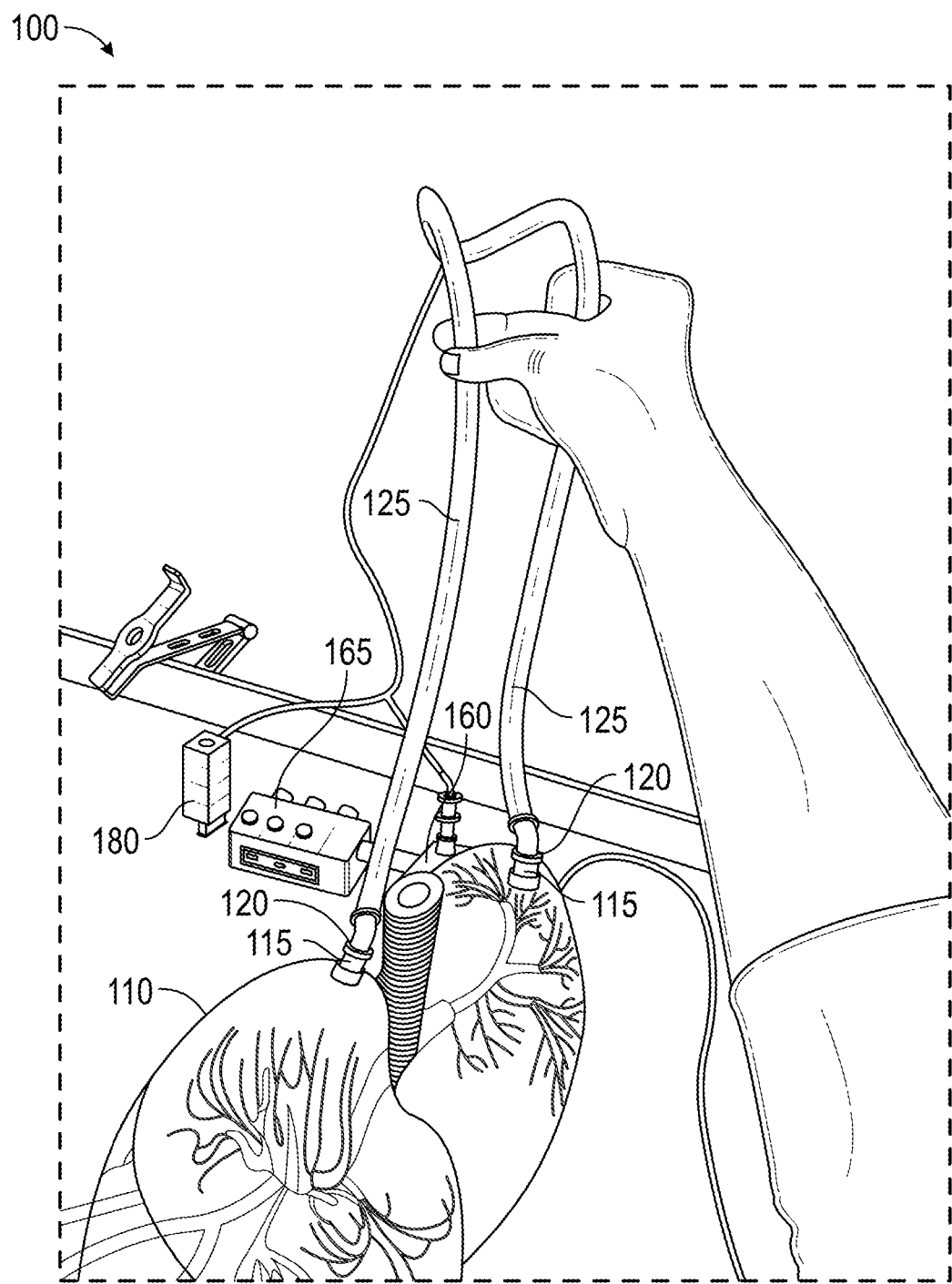
FIG. 1C illustrates the system of FIG. 1A showing the top view of the lung model.
Figure 1D:
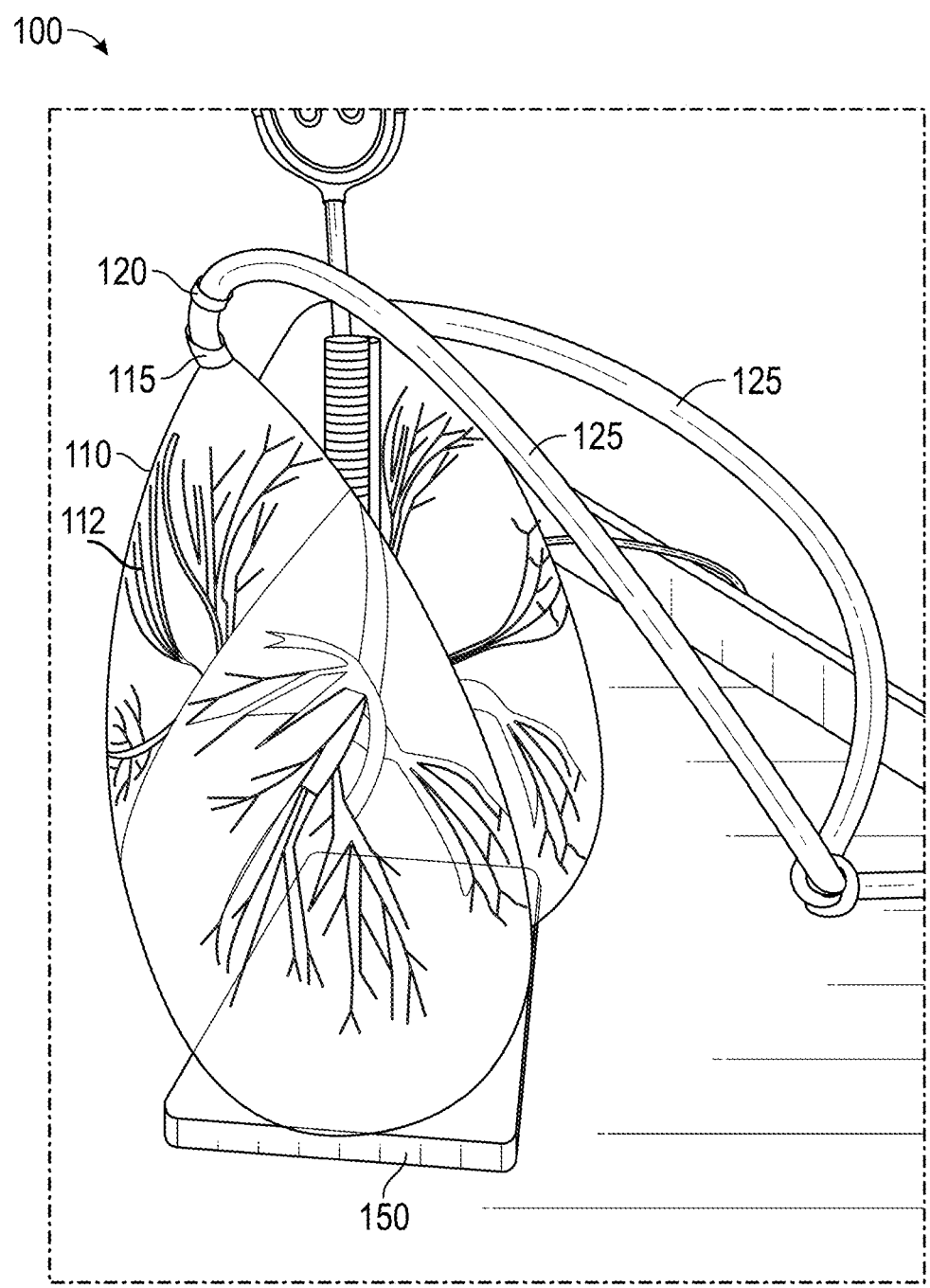
FIG. 1D illustrates the system of FIG. 1A showing a side view of the lung model.
Figure 1E:
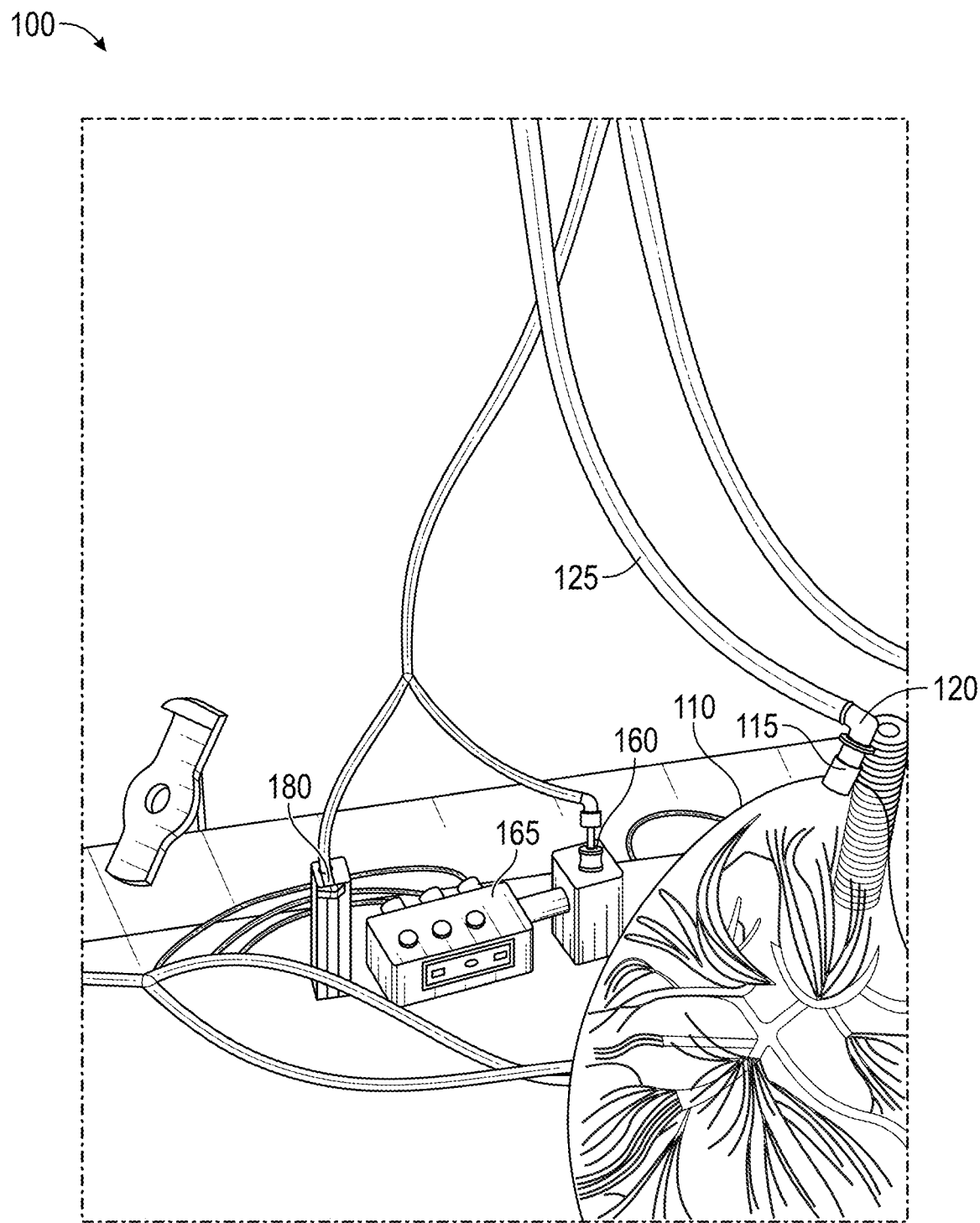
FIG. 1E illustrates the system of FIG. 1A with a clear illustration of a supply system and supply path.
Figure 1F:
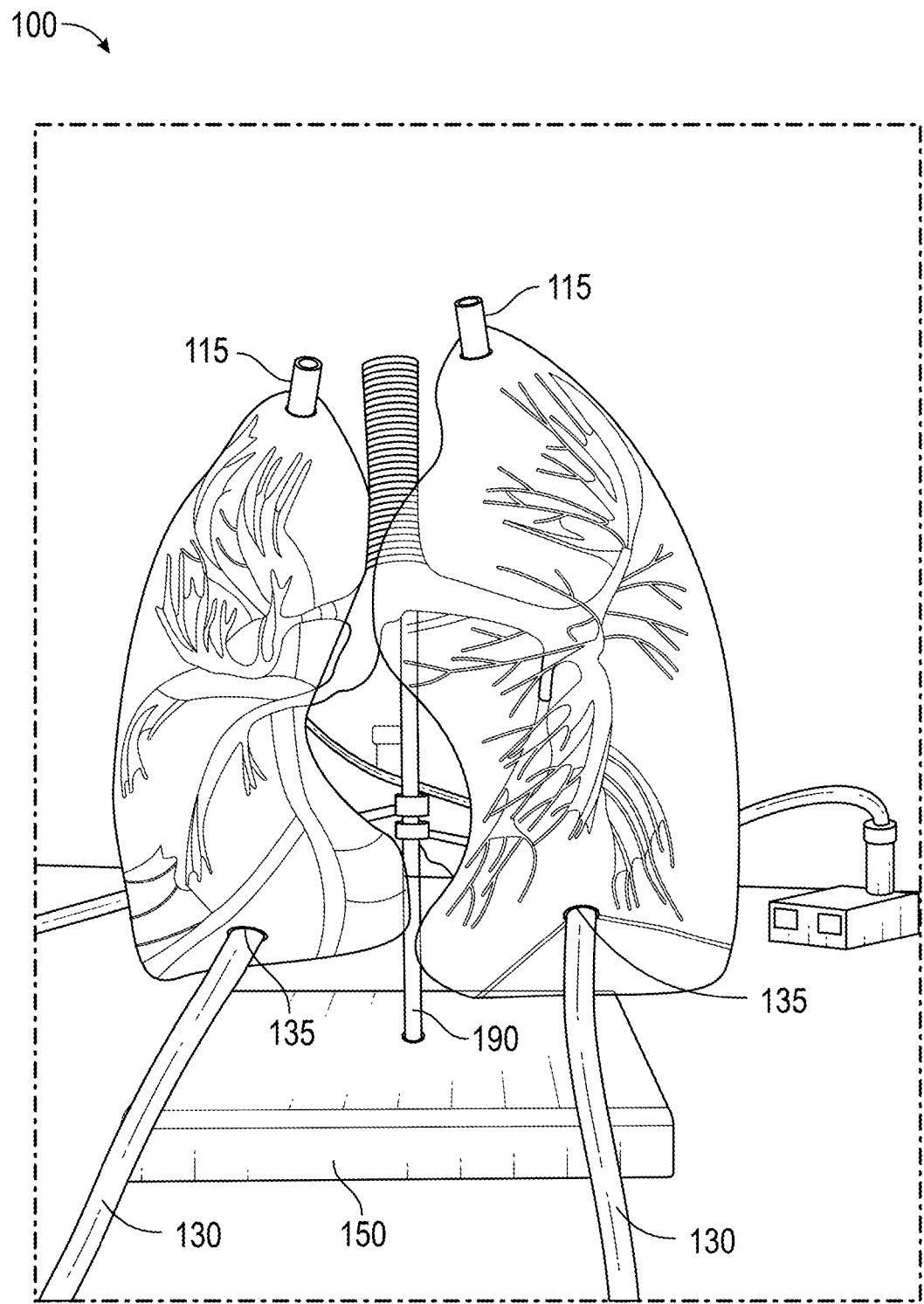
FIG. 1F illustrates the system of FIG. 1A with the supply path disconnected from the inlets of the model.
Figure 1G:
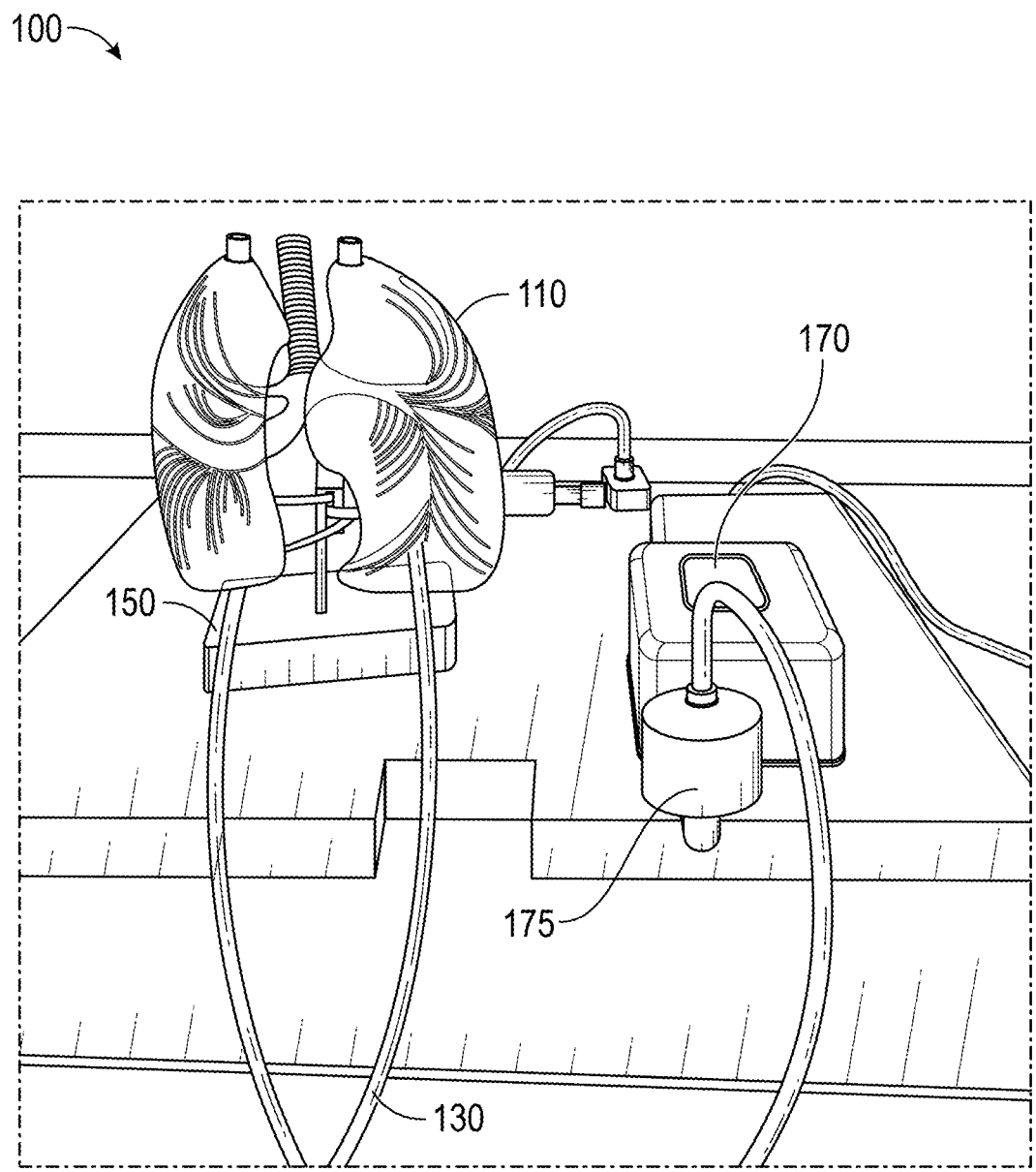
FIG. 1G illustrates another view of the system of FIG. 1A showing the vacuum system.
Figure 1H:
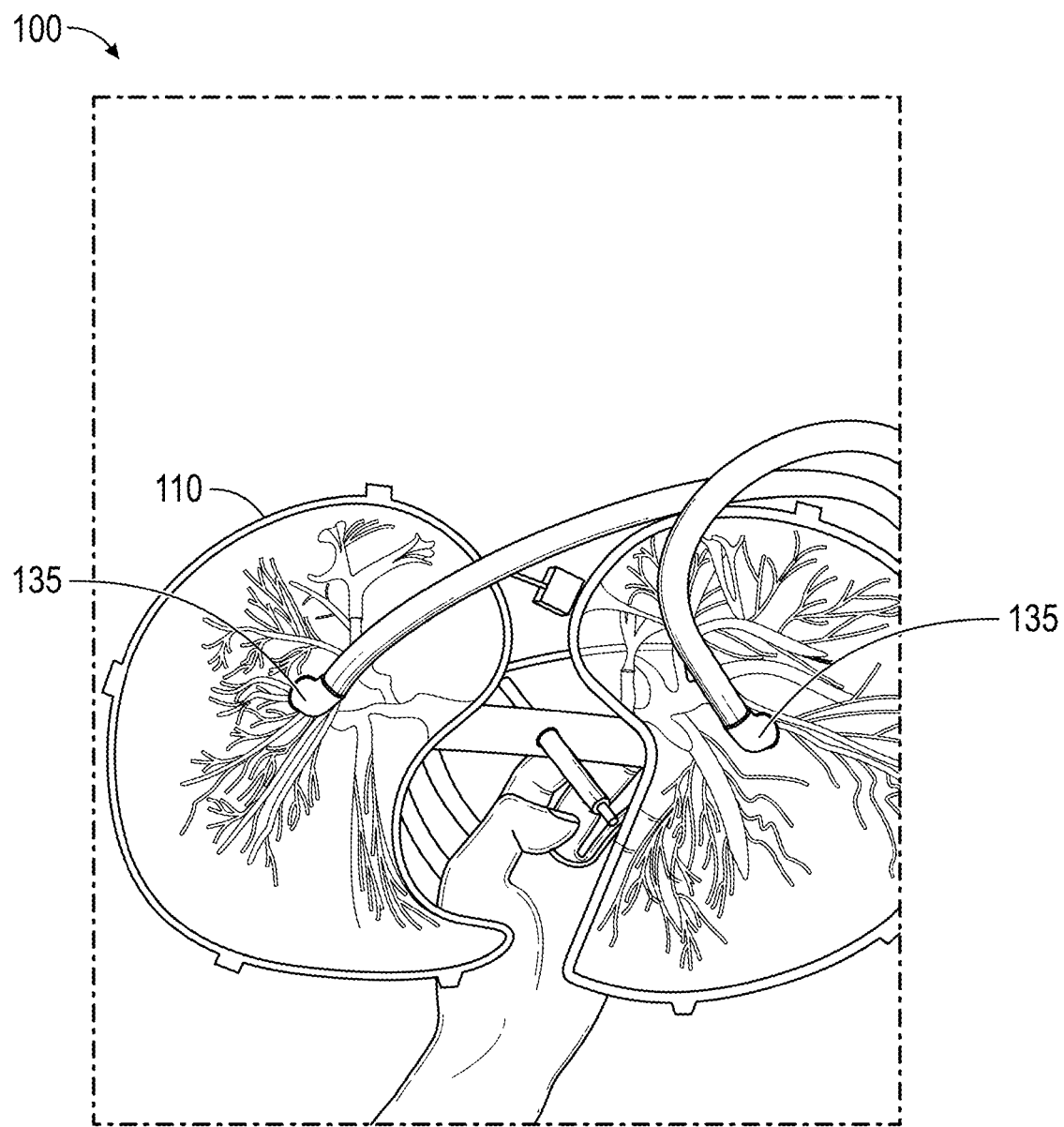
FIG. 1H illustrates a bottom portion of the model of the system of FIG. 1A.

The detailed description, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details.

The present invention is generally directed towards visualization systems and methods for research and/or educational purposes. Each visualization system can comprise a model of an organ or portion thereof, a supply system that optionally includes a controller, and one or more input devices and/or computing devices communicatively coupled to the model (e.g., wired or wirelessly). The model can be configured to emit or show one or more indicators based on one or more user inputs via the input device and/or controller. Such systems advantageously allow users to (a) select features of a test person whose organ is to be represented in the model (e.g., age, weight, height, gender), (b) select a substance and consumption features of the substance (e.g., mode of consumption, dose, dosage), and (c) visualize the changes that occur to the organ when the selected substance is consumed by the test person via the indicators. The changes that are represented can include indicators of short term effects, long term effects, and/or recovery.

The model of the organ can comprise a physical, three-dimensional model of the organ, a digital representation of the organ shown on a display screen, or any other suitable representation. The indicators emitted on the model are preferably visual, but other types of indicators are contemplated, such as sounds and smells. Exemplary indicators include a condensation or collection of fluid, changes in a color, brightness, or pattern of light(s) to light emitting diodes (LEDs) placed on the model. It should be appreciated that the indicators may appear based on the user inputs via input device and/or controller, and not necessarily based on (in part or in whole) on the vaporized test liquid entering and passing through the model.

Although the disclosure herein is generally directed to systems including brain and/or lung models, it should be appreciated that the model used in systems of the inventive subject matter can be of any organ where a user would benefit from visualizing the changes caused or likely to be caused by consumption of a substance.

Any suitable controller, input and/or computing device can be used to select features of the test person, the substance and consumption features, and/or any other aspects the user desires to be accounted for by the system in emitting the indicators. For example, the input device can comprise a tablet that is communicatively coupled to the model and includes a display and touch screen. As other examples, input components can be part of a supply system, or a substance inhalation system that includes a chamber that houses the model or is otherwise communicatively coupled to the model. The supply system can supply a vaporized substance (e.g., vaporized test liquid) into the model and/or a sealed chamber housing the model based on the user input via a controller or input device, which can cause or otherwise correlate with the indicators emitted by the model(s). The controller or input devices in some embodiments may be similar to the system described in U.S. Pat. No. 7,252,050 and may incorporate standard software as provided by Med Associates Inc. for selectively controlling and monitoring components of the supply or delivery system and exhaust system, as well as for selectively controlling timing and flow rates to the models and collecting test data.

FIGS. 1A-1H illustrate a visualization system of the inventive subject matter. System 100 comprises a model of a lung 110 positioned on a stand 150 including holder 190. Model of a lung 110 may be made from a clear, transparent or semi-transparent material that allows a user to visualize what is happening inside of the model when vaporized test liquid enters it via inlets 115 and exits via outlets 135.

Model of a lung 110 is configured to couple to a supply system comprising a vaporizer 160, controller 165 and liter per minute gauge 180 via a supply path 125 that comprises a hose delivery system. As illustrated, hose delivery system comprises multiple hose arms that include ends 120 that securely couple to one, two or several inlets 115, a gauge 180 and a vaporizer 160. Viewed from a different perspective, a hose delivery system can comprise a single hose arm body and branch out into multiple hose arms on one or both ends. In the illustrated example, the hose delivery system comprises a hose arm body extending between two Y-shaped ends having two hose arms each. A quick connect/disconnect may be provided between the end of the hose or hose arms of the first supply path and inlets 115.

Model of a lung 110 is also coupled to a vacuum system that comprises a vacuum pump 170 and filter (e.g., HEPA filter) 175 via a second supply path 130. Second supply path 130 comprises a hose system 130 that includes hose arms that securely couple to outlets 135 and the vacuum system. In the example illustrated, hose system 130 comprises a Y-shaped hose system wherein one hose arm couples to filter 175, which is coupled to vacuum pump 170, and two hose arms that each couple to an outlet of the model. When the vacuum pump 170 is on, air is sucked through the model 110 via supply path 125, inlets 115, outlets 135, and second supply path 130 and is scrubbed through filter 175. When the vaporizer 160 is also on, vacuum pump 170 sucks in air and vaporized test liquid through the model 110 via supply path 125, inlets 115, outlets 135, and through second supply path 130 where it is scrubbed through filter 175. Viewed from a different perspective, when the vacuum system is powered on, clean ambient air is sucked in and through the lung. The air may enter the supply path via the supply system, for example, via a port of the liter per minute gauge and/or an adjustable air vent from the vaporizer or eVape tank. When the vaporizer is also turned on (in addition to the vacuum system or pump that is on). The vaporized test liquid and the ambient air are combined and pass through the model via the supply paths. A quick connect/disconnect may be provided between the end of the hose or hose arms of the second supply path and outlets 135.

It should be appreciated that any suitable number of inlets and outlets may be provided on a model. While the illustrated embodiment shows two inlets and two outlets, it is contemplated that other models can comprise at least 1, at least 2, at least 3, at least 4, at least 5, or any other suitable number of inlets, and at least 1, at least 2, at least 3, at least 4, at least 5, or any other suitable number of outlets.

It should also be appreciated that a supply path can comprise any suitable number of hoses and hose arms. For example, a supply path may comprise multiple hoses that have one end that couples to the model and one end that couples to the supply system and/or vacuum system. As another example, a supply path can comprise a hose body that branches out into multiple hose arms having ends that couple to the model, the supply system and/or vacuum system. One or both ends of the hose body can branch out into multiple hose arms (e.g., at least 2, at least 3, at least 4, at least 5 hose arms).

Further it should be appreciated that a system may comprise any suitable number of supply systems (e.g., at least 1, at least 2, at least 3, at least 4, at least 5 or more), vaporizers (e.g., at least 1, at least 2, at least 3, at least 4, at least 5 or more), models (e.g., at least 1, at least 2, at least 3, at least 4, at least 5 or more), vacuum systems (e.g., at least 1, at least 2, at least 3, at least 4, at least 5 or more), controllers (e.g., at least 1, at least 2, at least 3, at least 4, at least 5 or more), input devices (e.g., at least 1, at least 2, at least 3, at least 4, at least 5 or more), and/or computing devices (e.g., at least 1, at least 2, at least 3, at least 4, at least 5 or more).

The model(s) through which the vaporized test liquid passes can comprise a model of a lung, and a user may view vaporized test liquid and air entering the lung model and forming a condensation. The condensation can be representative of the liquid that stays in the lung as condensation (e.g., phlegm). Additionally or alternatively, the model can comprise LED or other lights 112, for example, disposed in, on or along the model's trachea, primary bronchi, secondary bronchi, tertiary bronchi, bronchioles, cardiac notch, superior lobe, middle lobe, inferior lobe, apex, or any other component of the lung model. The different components may optionally be represented by different color LED lights. The user may be able to view bright lights for a healthy lung, and components of the model may start to dim to represent portions of the lung that would turn black or otherwise deteriorate when consuming a vaporized test liquid in accordance with the user's inputs via controller, input device and/or computing device as further described in connection with FIG. 3. Additionally or alternatively, the lights may change color, light up in a pattern, change a pattern, or otherwise indicate a change in the health of the lung.

Figure 2A:
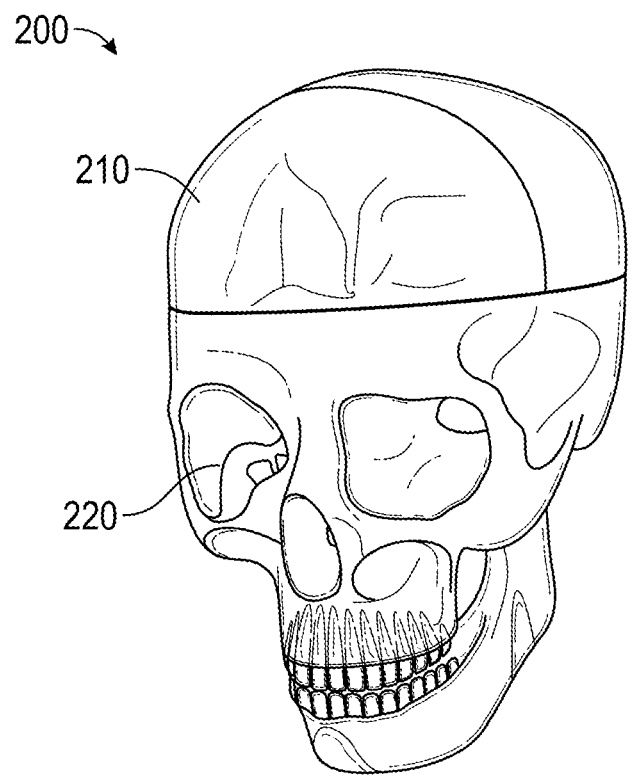
FIG. 2A illustrates a brain and skull model of the inventive subject matter.
Figure 2B:
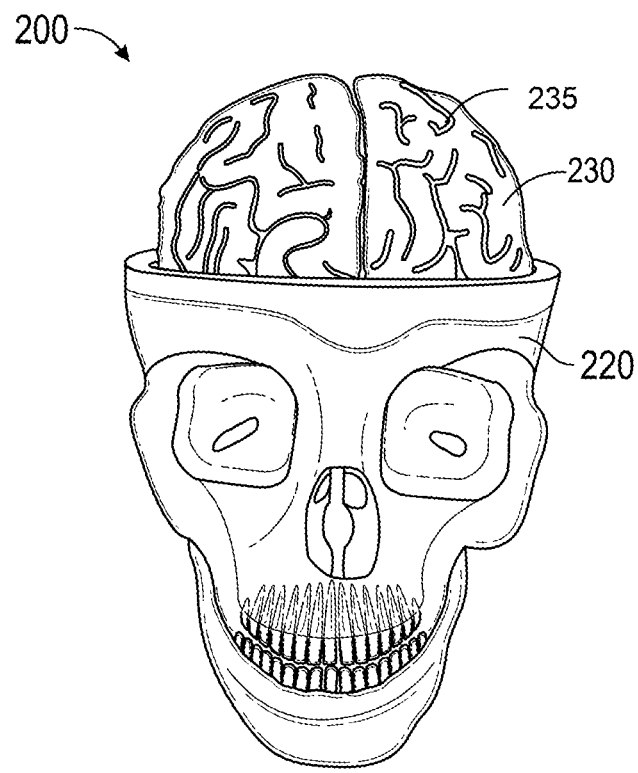
FIG. 2B illustrates the model of FIG. 2A with a top portion of the skull removed.

FIGS. 2A-2B illustrate a skull and brain model 200 of the inventive subject matter. Model 200 comprises a first component 210 and a second component 220 forming the model skull and housing brain model 230, which optionally includes LED lights 235.

The skull and brain model 200 may be configured to illustrate how various substances damages or otherwise affects a user's brain. The skull and brain model 200 may be communicatively coupled to an input device, computing device and/or controller, and configured to show an indication of an impact on the brain of a user that correlates with the vaporized test liquid entering the model of a lung or other organ. For example, the model can comprise LED or other lights 235, for example, disposed in, on or along the model's cerebrum, cerebellum, brainstem, occipital lobe, parietal lobe, frontal lobe, or any other component of the brain model. The user may be able to view bright lights for a healthy brain, and components of the model may start to dim to represent portions of the brain that are damaged or otherwise deteriorate when consuming a vaporized test liquid in accordance with the user's inputs via controller, input device and/or computing device. Additionally or alternatively, the lights may change color, light up in a pattern, change a pattern, or otherwise indicate a change in the health of the brain.

While the disclosure herein is largely directed to visual indications of organ health, all indications are contemplated, including for example, emitting a smell (e.g., the system may comprise a smell emitting component on or coupled to the model that is controllable via controller and/or input device), emitting a sound (e.g., the system may comprise a speaker on or coupled to the model that is controllable via controller and/or input device), changing a smell, and/or changing a sound based on the health of the organ. One, two, three, four, five or even more indicators can be shown or emitted based on a health of an organ that is being represented. For example, where a lung deteriorates due to inhalation of a substance, it is contemplated that there may be a visual indicator (e.g., condensation), a second visual indicator (e.g., dimming of a light), a third sound indicator (e.g., slowing of a pulse), a fourth smell indicator (e.g., emitting a rotting or unpleasant smell), or any combination thereof. The indicators can also indicate an improvement of a health of the organ represented, for example, where a user stops using a substance and begins to recover.

One contemplated use of systems of the inventive subject matter is in an education program for elementary schools, junior high schools, high schools, and/or colleges. The education program can provide a comprehensive understanding of various substances known to be addictive and how they affect the human body. Such a program can bring awareness by allowing students to learn about the short term and long term effects of consuming harmful substances through interactive laboratory experiments. In this era, it is imperative that the next generation gets hands on experience with addiction studies so that they are better qualified to prevent the use of such substances for the future.

Figure 3:
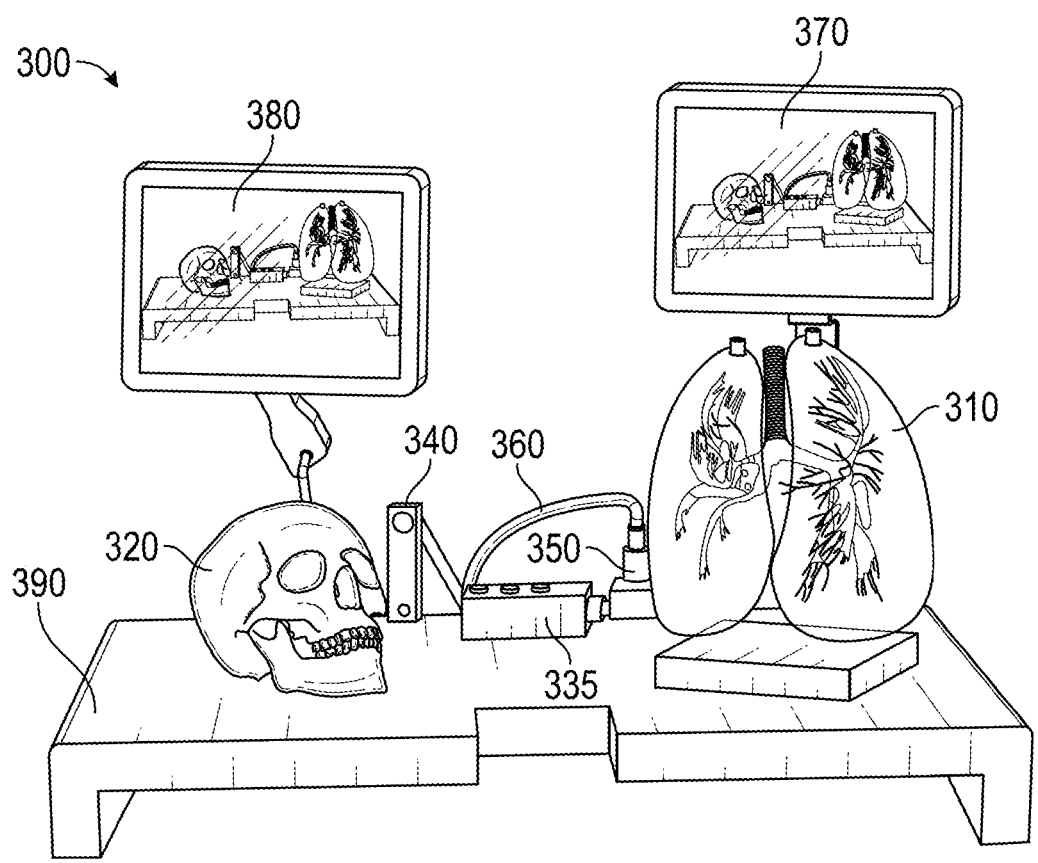
FIG. 3 illustrates another embodiment of a system of the inventive subject matter.

FIG. 3 illustrates a system of the inventive subject matter on a table top 390, which could be used in a classroom setting. System 300 includes the components of system 100, including a model of a lung 310, a supply system comprising a controller 335, vaporizer 350 and liter per minute gauge 340, and one or more supply systems or hos systems 360. System 300 further comprises a skull and brain model 320 similar to model 200 of FIGS. 2A-2B, an input device 370, and a computing device 380.

System 300 is an exemplary interactive system through which students or other users can control administration of a vaporized test liquid and visualize the impacts of such consumption on a brain, lung and/or other organs. The system may be used in a classroom setting where each student or group of students works with a system and one or more test liquids based on a curriculum. Such systems may simulate experiments as they would be conducted in universities or research institutes. The systems mimic vaping of harmful substances, and can be used in experiments for various courses, including for example, mathematics and biology. The user may control the vape time, hits/cycle, drug type, drug calculation, watts, and any other factors for their experiments. One tablet (e.g., input device 370) may be used to perform the experiments and/or adjust the vaporizer settings (e.g., to input commands to cause the vaporizer to turn on/off, to deliver a vaporized test liquid of a specified dosage and dose, number of hits per hour, how long each hit lasts (e.g., 20-30 3-second hits per hour)). The vaporizer may comprise a well-known vaporizer system (e.g., a Juul™ device), or may mimic a number of different vaping devices based on adjustment of the vape settings. Another tablet (e.g., computing device 380) may show the classroom curriculum and/or show a visual or other indication(s) of drug use (e.g., by modifying an image of a user's face to show how a drug affects the user's appearance).

Computing device 380 may be wired or wirelessly connected to a network/internet, and may be configured to present a curriculum to a user. Input device 370 may be wired or wireless connected to a network, and may be communicatively coupled to the controller, the supply system, the vaporizer, the gauge, the computing device, the brain and skull model, the lung model, and/or the vacuum system. In some systems, the computing device and input device may comprise a single device (e.g., a single tablet, laptop, computer) having all functionalities of the computing device and input device described herein. In some systems, the computing device and input device may comprise separate devices optionally connected to one another via a network.

The user may upload an image of a user (e.g., the user's face) via at least one of the computing device 380 and input device 370, and may be able to visualize the changes to a user's face through drug use over time. For example, with continuous drug use, the image may be modified to show a loss or change in teeth, undereye bags increasing in size or darkness, wrinkles, or any other indication of the impact drug use has on users. Skull and brain model 320 may be communicatively coupled to at least one of the input device and computing device such that the brain shows or emits indications of an impact the user selected drug has on a brain based on the user's inputs into the input device. The lung model 310 and any other models of the system may similarly be communicatively coupled to at least one of the computing device and the input device, for example, via a wired or wireless communication protocol (e.g., Bluetooth, RFID, WiFi, internet communication) or any other suitable communication technology. User inputs may include, for example, an experiment start date or time, an experiment length, the number of puffs per minute or hour, the length of each puff, the dosage of the substance in the e-liquid, total amount of the substance (e.g., nicotine) or other component (e.g., propylene glycol) to be consumed over a period of time, wattage, amount of substance (e.g., nicotine) in a ml of e-vape liquid, the test substance (e.g., nicotine, alcohol, THC), and/or information on the user (e.g., age, sex, health, weight, height), and may control the delivery of the vaporized test substance into and through the lung or other model the supply system and vacuum system are coupled to.

Curriculum

Applicant has developed a curriculum for education of drug prevention that incorporates mathematics, science, and physics. The courses in the curriculum can teach students how the brain and lungs, and possibly other organs, are affected using drugs such as cocaine, methamphetamine, tetrahydrocannabinol (THC), psychostimulants nicotine, and Sufentanil.

A user (e.g., a student, a teacher) will be able to create and/or use their own model to study. The user will also be able to select features of the subject whose organ(s) are represented by the model(s) such as the age, weight, height, educational background, and living environment. For example, students will be able to create a model representing an organ of someone they know to make the studies more realistic. These factors may be indicated by elements such as the size, shape, and/or lighting (e.g., brightness, color(s)) of the model of the organ. The user will also be able to select what substance(s) to study, and determine how it should be administered (e.g., quantity, frequency, form of consumption). The user can also make modifications to visualize the impact changes to the substance(s) consumed, the amount, frequency, etc. has on the organ over the short term and long term. The curriculum is open to several different scenarios that people experience in real life, for example, overdose, relapse, intermittent vaping, and so forth/ The curriculum may also provide instructions on how to deal with potential emergencies and overdoses. For example, the curriculum may provide instructions on when and how to administer Narcan, and show the affects of administering Narcan on one or more organs and/or the user's face.

Computing Devices

The curriculum can be programmed into a computing device 380 such as a tablet with an interactive interface and touch screen. The lesson or class presented to the user can be based on the substance(s) selected. The curriculum portion of classes can be delivered through the tablet, with tests administered during and/or after each class using an input device 370, models 310, 320, supply system (including 340, 335, 350), vacuum system and/or one or more supply paths (for example those described in connection with FIGS. 1A-1H).

The same or different computing device can be used as the input device that allows a user to make selections related to the model(s) and the administration of the substance(s). The input device may be wired or wirelessly coupled to the supply system, vacuum system and/or model(s) such that user inputs via the input device directly or indirectly cause (a) vapor(s) to flow into the test chamber(s), and/or (b) model(s) to emit or otherwise show indicator(s). Additionally or alternatively, the input device may be a part of the supply system. Additionally or alternatively, controller 335 of the supply system can control some or all operation of the supply system (e.g., amount, rate, concentration of vaporized test liquid that enters and passes through model 310) while the input device causes the indicators of the models (310 and/or 320) to be modified based on the user inputs via input device.

In some aspects, the computing devices and/or input devices may be configured to recognize a face or other biometric feature of a user before allowing the devices to be used.

Models

The supply paths, for examples supply paths identical to supply paths 125 and 130) may be directly coupled to one or more models (e.g., lung model 310) via inlets and outlets. Additionally or alternatively, the supply paths may be coupled to inhalation chambers housing the model(s). For example, substance inhalation systems and methods such as those described in U.S. Patent Application Publication 2018/0228990 and/or U.S. Pat. No. 7,252,050 to Maury D. Cole can be used to house one or more models.

The brain and lung models can respond to the various selections, and emit indicators to allow a user to visualize how a substance affects the brain and/or lung and/or other organ. Viewed from a different perspective, the tablets can have interactive, selectable, and/or adjustable "bio" parameters relatable to the brain/lung function based on drug selected. Biologically relevant "patient" vitals can be representative of the drug(s), dose, and/or delivery. Biologically relevant "patient" status (dopamine response, vegetative state, cell death, stroke, clot, etc.) can also be represented by visual or other indicators such as lights.

Advantageously, students can use the system to create their model and compare it to other models. They may be able to see, for example, the differences in the ability to recover based on the age, gender, or background of the subject represented in the model. If viewing two models with one brain representing a 35 year old and another representing a 25 year old, the student can see that the brain cells at an older age do not rejuvenate after strenuous drug use while brain cells at a younger age does. Brain cells of a younger person would generally rejuvenate faster, but would also die off faster as they do drugs longer when they get older. This can be seen using a system of the inventive subject matter. Once the brain and/or the lung has had numerous hits of particular drugs, the mental and the physical effects of these drugs can be seen (e.g., a color, brightness, or pattern showing the brain is dying or dead; a color, brightness, or pattern showing the lungs are turning black and/or that there is moisture in the lungs from overuse of vaporized drugs, some of which may remain in the lungs).

The quality of the models is important to the inventive subject matter as these are what the user will look at to see what affect substances have on a person's brain, lung, or other organ. Students will be able to look at a model of the brain and the lungs with all of the parts, specifically the parts that are most affect by inhaled drug use. They will see the long-term effects of brain cells that are lost, and how much actually gets rejuvenated based on various factors. Some contemplated systems can come with a simulated brain model and a simulated lung model, and each component of the model can be shown and/or labeled (e.g., trachea, primary bronchi, secondary bronchi, tertiary bronchi, bronchioles, cardiac notch, superior lobe, middle lobe, inferior lobe, apex of lung; cerebrum, cerebellum, brainstem, occipital lobe, parietal lobe, frontal lobe, brain cells of brain).

The brain model can be a clear, 3D printed anatomical version of the brain with associated LED lighting to reflect cell health. The lights may be designated to various structures of the brain. The models can be split into different chambers, portions and/or hemispheres for anatomical likeness. In some embodiments, the lights will highlight which parts of the brain are most affected by consumption of the substance(s) based on the parameters selected. The brain study can be paired with an interactive lecture through the tablet or other computing device. The LED brain model can interact with the light density meter to reflect higher dosage and overdose situations. States such as seizures, a vegetative state, compartmental cell death, strokes, aneurisms and so forth can be represented via the brain model. Dopamine receptors, represented by LEDs (e.g., LEDs 235) can light up signaling addition or dependency on the substance. Users will also be able to look at the models once it goes through rehabilitation after overuse of a substance (e.g., lights becoming brighter or changing back to a healthy color), as well as what happens after a relapse.

The lung model can similarly be a clear 3D printed anatomical version of the lung with associated LED lighting to reflect cell health (see FIG. 3 below as an example). Each of the models may comprise 1, 2, 3, 4, 5 or even more components that removably couple to one another for easy cleaning, repair and/or replacement of internal components of the models. With vaporized test liquid passing through the lung model, a user can visualize how much vapor turns into liquid that does not come out of the lungs measured over time.

Similar biologically relevant responses can be included as described above in connection with exemplary brain models. The lung model can also show what part(s) of the lung inhaled substances affect most, and what type of damage is done (e.g., scarring, pneumonia, pneumothorax).

A vapor can be delivered to one or more models, for example a lung model (or test chambers they may optionally be housed in). Vapors of different colors can optionally be used to differentiate which substance is being used or represented. For example, brown vapor can be used to represent heroin, black vapor can be used to represent nicotine, and so forth. As noted above, the system may include or be coupled with an input device and/or controller that allow users to control the delivery of the vapor, select features of a test person whose organ is to be represented in the model, and/or select substance and consumption features of the substance. Based on the user inputs, the user can see vapor representing the substance selected enter the chamber where the model of an organ is housed, and see how the vapor affects the organ via the indicators emitted or presented.

The Vaporizer

Any suitable vaporizer or vaporizers may be used in systems of the inventive subject matter, including those described in U.S. Patent Application Publication 2018/0228990 and/or U.S. Pat. No. 7,252,050 to Maury D. Cole. In some embodiments, a replaceable cartridge contains a wick soaked in e-liquid containing the substance to be tested or a substance representative of a drug to be tested, such as nicotine or other drug, as well as a carrier such as propylene glycol (PG) or vegetable glycerol (VG) which creates an aerosolized vapor or smoke containing nicotine, in a similar manner to an e-cigarette. Cartridges may be of more robust construction than typical e-cigarette cartridges. They may be pre-filled with the liquid or the e-vape liquid containing the test substance or substance representative of a drug may be injected through an open top of the cartridge. After filling, a quick connect/disconnect fitting may be attached to the top or other portion for releasable connection to a hose, such as one arm of Y-shaped hose as seen in FIGS. 1A-1H. The vaporizer and/or a controller coupled to the vaporizer may include dials or buttons for powering and turning off the vaporizer, and controlling voltage for atomization to control the dose of atomized substance such as nicotine or other drugs. A display window may be provided on the controller and/or vaporizer to indicate current voltage.

As illustrated in FIGS. 1A-1H, a selected one of the cartridge outlets may be connected to one side of a y-splitter hose (of the first supply path) via quick connect/disconnect fitting to provide drug infused vapor via suction to the inlets 115 when outlets 135 are connected to a vacuum source, and a liter per minute gauge may be connected to the other side of y-splitter to provide clean ambient air to inlets 115. When the vaporizer is turned off, ambient air only is supplied to model 110 The outlet of y-splitter may be connected to model inlets 115 via a male/female quick disconnect or any other coupling mechanism. A hose of the second supply system may be connected from model outlets 135 to the inlet of a filter (e.g., HEPA filter) 175, and the filter may be connected via a vacuum hose to a vacuum outlet of air compressor or vacuum pump 170. The air outlet of air compressor or vacuum pump 170 may exhaust via outlet hoses (not shown). The vacuum pressure creates suction at the outlets 135 of the model 110, which allows clean air regulated by liter per minute gauge to enter the model via air inlets 115 through a hose arm of the supply path hose (Y-splitter). At the same time, drug containing or no drug containing vapor or smoke may also be drawn into the chamber from the outlets of the vaporizer through the other side of the supply path hose (Y-splitter) by suction when the vape box (and vacuum source) is turned on. Air combined with vaporized test liquid travels through the model and exits via outlets 135. The mixture exiting the model passes through a filter before exiting the system. The controller and/or an input device may be connected to the vaporizer, vacuum pump or air compressor, and/or liter per minute gauge via wires or wireless communication for adjustment of the concentration of vapor in the drug delivered via supply system and control of the delivery period. When the vaporizer is turned off, the system continues to deliver air drawn into model 110.

The Vapor

The vapor used in the classroom experiments can be substance-free and non-toxic. Students can "mix" their own "drug" or substance into a base liquid (e.g., vegetable glycerin (VG)/propylene glycol (PG) mixture). The substance can have designated coloring based on the "drug" selected.

Contemplated substances to be represented by the vapor include, among other things, alcohol, nicotine, methamphetamine, heroin, cocaine, fentanyl (opioids), psychostimulants, and poly drugs.

The supply path may connect with the inlet(s) on the lung model such that the vaporized test liquid enters the model of the lung in the same way it would go through bronchioles of the lung. The bottom or other portion of the lung model can be where the vacuum hose is connected to suck vapors through both lungs before exiting via the supply path hose and passing through the HEPA filter.

Thus, specific examples of visualization systems and methods of the inventive subject matter have been disclosed. It should be apparent, however, to those skilled in the art that many more modifications besides those already described are possible without departing from the inventive concepts herein. While examples and variations of the many aspects of the invention have been disclosed and described herein, such disclosure is provided for purposes of explanation and illustration only. Thus, various changes and modifications may be made without departing from the scope of the claims. For example, not all of the components described in the systems or steps described in the methods are necessary, and the invention may include any suitable combinations of the described components and steps. Accordingly, embodiments are intended to exemplify alternatives, modifications, and equivalents that may fall within the scope of the claims. The invention, therefore, should not be limited, except to the following claims, and their equivalents.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A visualization system, comprising:
    a model of an organ or portion thereof comprising an inlet port and an outlet port;
    a supply system for supplying a vaporized test liquid into the inlet port;
    a first supply path between the supply system and the inlet port; and
    wherein the model is configured to show a first visual indicator based on the vaporized test liquid entering the model.

2. The visualization system of claim 1, wherein the supply system comprises a vaporizer, a controller, and a liter per minute gauge.

3. The visualization system of claim 2, further comprising a second supply path and a vacuum system, wherein the second supply path extends between the outlet port and the vacuum system.

4. The visualization system of claim 3, wherein the vacuum system comprises a vacuum pump and a HEPA filter.

5. The visualization system of claim 1, wherein the first visual indicator comprises a condensation.

6. The visualization system of claim 1, wherein the first visual indicator comprises at least one of a color, a pattern and a brightness of a light.

7. The visualization system of claim 4, wherein the vacuum pump is configured to draw ambient air into the model via the liter per minute gauge.

8. The visualization system of claim 7, wherein the vacuum pump is further configured to draw the vaporized test fluid from the vaporizer into the model when the vaporizer is on.

9. A visualization system, comprising:
    a first model of a first organ or portion thereof comprising an inlet port and an outlet port;
    a supply system for supplying a vaporized test liquid into the inlet port;
    a first supply path between the supply system and the inlet port;
    a first input device communicatively coupled to at least one of the supply system and the first model; and
    wherein the first model is configured to show a first visual indicator based on the vaporized test liquid entering the first model.

10. The visualization system of claim 9, further comprising a second model of a second organ, wherein the first input device is communicatively coupled to the second model of the second organ.

11. The visualization system of claim 10, wherein the second model is configured to show a second visual indicator based on a user input into the first input device that corresponds to an amount or type of vaporized test liquid entering the first model.

12. The visualization system of claim 9, further comprising a computing device programmed with a curriculum relating to use of the first input device, the supply system, and the first model.

13. The visualization system of claim 12, wherein a display associated with at least one of the input device and the computing device is configured to display a second visual indicator based on a user input into the first input device that corresponds to an amount or type of vaporized test liquid entering the first model, and wherein the second visual indicator is a modified image of a user's face.

14. The visualization system of claim 9, wherein the first organ is a lung, and the second organ is a brain.

15. The visualization system of claim 9, wherein a test liquid that that is vaporized to form the vaporized test liquid comprises at least one of nicotine, a methamphetamine, and a tetrahydrocannabidiol.

16. The visualization system of claim 9, wherein the vaporized test liquid is representative of a drug but does not comprise the drug.

17. The visualization system of claim 9, further comprising a second supply path and a vacuum system, wherein the second supply path extends between the outlet port and the vacuum system.

18. The visualization system of claim 17, wherein the vacuum system is configured to draw ambient air into the model via the supply system.

19. The visualization system of claim 17, wherein the vacuum system is further configured to draw the vaporized test fluid from the supply system through the inlet port and outlet port of the first model when the vaporizer is on.

20. The visualization system of claim 9, wherein the first model comprises a component shaped as a human lung, and wherein the second model comprises a component shaped as a brain.

* * * * *